(12) United States Patent
Hu

(10) Patent No.: US 10,593,371 B2
(45) Date of Patent: Mar. 17, 2020

(54) ELASTIC-PLATE FIXING STRUCTURE OF TRAY FOR DATA ACCESSING DEVICE

(71) Applicant: CHENBRO MICOM CO., LTD., New Taipei (TW)

(72) Inventor: Tung-Yang Hu, New Taipei (TW)

(73) Assignee: CHENBRO MICOM CO., LTD., New Taipei (TW)

(*) Notice: Subject to any disclaimer, the term of this patent is extended or adjusted under 35 U.S.C. 154(b) by 0 days.

(21) Appl. No.: 16/137,503

(22) Filed: Sep. 20, 2018

(65) Prior Publication Data

US 2019/0096442 A1  Mar. 28, 2019

(30) Foreign Application Priority Data

Sep. 22, 2017  (TW) ............................. 106214154 U

(51) Int. Cl.
   *G11B 33/12* (2006.01)
   *G11B 33/08* (2006.01)
   *G06F 1/18* (2006.01)

(52) U.S. Cl.
   CPC ............ *G11B 33/127* (2013.01); *G06F 1/187* (2013.01); *G11B 33/08* (2013.01); *G11B 33/124* (2013.01)

(58) Field of Classification Search
   CPC ................. H05K 1/181; H05K 7/1427; H05K 2201/10545; H05K 7/1401; H05K 5/0204; H05K 5/0217; H05K 5/0221; H05K 7/1487; H05K 7/1488; H05K 7/1489; H05K 7/20772; H05K 7/20781; G06F 1/181; G06F 1/187; G06F 11/0727; G06F 1/185; G11B 33/08; G11B 33/124; G11B 27/34; G11B 33/02; G11B 33/128; G11B 33/127
   See application file for complete search history.

(56) References Cited

U.S. PATENT DOCUMENTS 5,421,236 A * 6/1995 Sanger .................... G04F 5/025
                                                        84/464 R
7,092,250 B2 * 8/2006 Chen .................... H05K 7/1487
                                                        361/679.35

(Continued)

FOREIGN PATENT DOCUMENTS

TW        I285527 B      8/2007
TW        I443651 B      7/2014
TW        I555015 B     10/2016

*Primary Examiner* — Jinhee J Lee
*Assistant Examiner* — Ingrid D Wright
(74) *Attorney, Agent, or Firm* — CKC & Partners Co., LLC

(57) ABSTRACT

An elastic-plate fixing structure of a tray for receiving a data accessing device includes a base case and a fastening unit. The base case includes a coupling portion. The fastening unit includes an elastic buckle piece, a pressing elastic plate, a vibration absorbing pad, a first clamping plate, a positioning protrusion and a second clamping plate and has a clamping space between the first clamping plate and the second clamping plate for receiving the vibration absorbing pad. The elastic buckle piece is coupled to the coupling portion. The pressing elastic plate is connected to the elastic buckle piece. The vibration absorbing pad is positioned between the elastic buckle piece and the pressing elastic plate. The first clamping plate is connected to the elastic buckle piece. The positioning protrusion is formed on the first clamping plate. The second clamping plate is curvedly connected to the pressing elastic plate.

10 Claims, 14 Drawing Sheets

(56) References Cited

U.S. PATENT DOCUMENTS

| 7,995,337 B2* | 8/2011 | Kuo | G11B 33/08 |
| | | | 312/223.1 |
| 2008/0180901 A1* | 7/2008 | Yang | G06F 1/187 |
| | | | 361/679.34 |
| 2009/0201605 A1* | 8/2009 | Lin | G11B 33/08 |
| | | | 360/97.19 |

* cited by examiner

ELASTIC-PLATE FIXING STRUCTURE OF TRAY FOR DATA ACCESSING DEVICE

RELATED APPLICATIONS

This application claims priority to Taiwan Application Serial Number 106214154, filed Sep. 22, 2017, which is herein incorporated by reference.

BACKGROUND

Field of Disclosure

The present disclosure relates to an elastic-plate fixing structure of a tray. More particularly, the present disclosure relates to an elastic-plate fixing structure of a tray used for receiving a data accessing device, in which the elastic-plate fixing structure includes a base case and a fastening unit, and a sidewall of the base case is coupled with the fastening unit, and a vibration absorbing pad is positioned between an elastic buckle piece and a pressing elastic plate, so as to provide a traveling space for a positioning protrusion of the elastic buckle piece to be engaged with or disengaged from an engaging hole of the data accessing device, thus achieving the object of rapidly inserting or withdrawn the data accessing device in or from the tray.

Description of Related Art

Nowadays, with the development of network cloud technology and Internet of Things (IoT), computer and server technologies are advanced rapidly. The development trends of the computer and server technology are mainly directed towards aspects of high computing performance, fast speed and small size. While a great amount of data operations are processed, high-density and large-scale data accessing devices (e.g., hard disks, optical drivers, etc.) are urgently required for storing data. In a conventional rack server, a number of server chassis can be removably installed in a number of accommodation spaces between layers of the rack server respectively, and server units received in the respective server chassis are electrically connected to each other, so as to have a multiplex server, such that the entire server system can be regarded as a large cabinet server in which each server chassis can receive multiple data accessing devices, thereby increasing storage capability of the rack server.

The conventional server chassis can be roughly divided into four types of configuration specification, such as 1U, 2U, 3U and 4U. Thus, under the same type of configuration specifications, the industry not only has to consider how to contain data accessing devices into the limited space of the server chassis, but also has to consider the space configurations, the fixing method and disassembly and replacement difficulties of the data accessing devices, so as to design the structure which does not occupy too much space and can allow the data accessing devices to be maintained and replaced easily. When a user desires to perform maintenance or replacement operations on the data accessing devices, the data accessing devices installed in the server chassis has to be easily and rapidly replaced, and the assembly structure and manufacturing cost of the server chassis also has to be considered, so as to meet the cost and demand of a huge amount of data accessing devices. In a long-term use of the server chassis, the stability of the overall server system and the convenience of maintenance and replacement are needed to be considered for allowing the user to operate the server chassis conveniently, so as to reduce downtime and manpower losses.

However, a conventional data accessing device is normally mounted on a fixed frame or a tray, and then the fixed frame or the tray loading the conventional data accessing device is assembled inside a computer or a server chassis. A common fixing method of the data accessing device is to pass through a through hole of the outer casing of the fixed frame or the tray by a screw, then to align into a screw hole on a side of the data accessing device. In order to provide better stability during actual use of the data accessing device, the general fixed frame or tray must pass a Rotational Vibration Index (RVI) test to minimize the problems caused by impact or vibration. However, when the aforementioned data accessing device is operated, high-frequency vibration, or external vibration transmitted to the data accessing device from the server chassis by external force is usually generated. If the data accessing device is simply mounted on the fixed frame or the tray by means of screw locking, the data accessing device will often be caused continuous high-frequency vibration or resonance due to the lack of appropriate anti-vibration design. Therefore, not only screws may be easily loosed from the data accessing device, but also the data accessing device is damaged to reduce service life of the data accessing device.

In addition, some manufacturers may currently make fixed convex hull structures on inner surfaces of the fixed frame or the tray to be fastened to fixing holes formed on the sides of the data accessing devices by the fixing convex hull structures. Although a tool-less fixing frame or tray design may quickly assemble to or disassemble from the data accessing device, however, if the fixed convex hull structure fastens the data accessing device too tight, problems that the data accessing device is difficult to be assembled to or disassembled may be happened; if the fixed convex hull structure fastens the data accessing device too loose, problems that reliability issues and performance test results of rotational vibration index are poor may be happened. Therefore, how to develop a design construction having convenience of both assembly and disassembly, improving the reliability issues and performance test results of rotational vibration index, and further increasing the service life of the data accessing device, is the direction for those who engaged in this industry to eagerly research and improve.

SUMMARY

Thus, in view of the above-mentioned problems and shortcomings, after the inventors have collected such relevant information through various evaluations and considerations and used the trial and modification of many years of R&D experience in this industry, an elastic-plate fixing structure of a tray for a data accessing device is provided therefore to solve the problems mentioned above.

According to a main objective of the disclosure, the elastic-plate fixing structure includes a base case and a fastening unit. The base case is provided with an accommodation space in an internal thereof, each of two sidewalls of the base case is provided with at least one coupling portion which is coupled to the fastening unit, and the base case is provided with a hollow portion at the periphery of each of the coupling portions. The fastening unit includes an elastic buckle piece, a pressing elastic plate, a vibration absorbing pad, a first clamping plate, a positioning protrusion, a second clamping plate and a clamping space. The elastic buckle piece is coupled to an inner side surface of the coupling portion, the pressing elastic plate is overlapped and connected to one side of the elastic buckle piece, the vibration absorbing pad is fixedly positioned between the elastic buckle piece and the pressing elastic plate, the first clamping plate extends outwards from the elastic buckle piece and is aligned with the hollow portion, the positioning protrusion is formed on an inner surface of the first clamping plate and extends towards the accommodation space, the second clamping plate curvedly extends outwards from the pressing elastic plate aligned with the first clamping plate to extend towards the hollow portion, and is exposed outwards from the hollow portion, and the clamping space is formed between the first clamping plate and the second clamping plate for receiving the vibration absorbing pad therein. A backward space is provided between the pressing elastic plate and one sidewall of the base case such that the elastic buckle piece is allowed to move backwards to the hollow portion through the backward space, and a traveling space is provided for allowing the positioning protrusion to be engaged with or disengaged from the fixing hole of the data accessing device. The data accessing device is fixed on the base case without needing to use screws, and the labor and cost of locking with the screws can be saved, and the object of rapidly assembling or disassembling the data accessing device can be achieved.

According to a secondary objective of the disclosure, when the data accessing device is assembled on the base case, one side of the data accessing device is first placed obliquely into the accommodation space of the base case, and the fastening bumps of the positioning portion are respectively buckled to the fixing holes of the data accessing device, and next, the data accessing device is pressed downwardly to a predetermined position. After the other side of the data accessing device abuts against the positioning protrusion of the elastic buckle piece, a traveling space for the positioning protrusion can be provided to be engaged with the fixing hole of the data accessing device so as to facilitate the installation of the data accessing device smoother.

According to another objective of the disclosure, when desiring to pull out the data accessing device, a user only needs to upwardly pull the data accessing device at its bottom so as to press the positioning protrusion of the elastic buckle piece by the fixing hole of the data accessing device, such that the positioning protrusion can movably swing towards the hollow portion. When the data accessing device coordinated with the base case is not yet inserted into a chassis, the backward space is formed between the pressing elastic plate and one sidewall of the base case for allowing the elastic buckle piece to move backwardly to the hollow portion, and thus the positioning protrusion is collectively moved to be disengaged from the fixing hole of the data accessing device. Therefore, the convenience of assembling or disassembling the data accessing device is increased.

According to another objective of the disclosure, when the data accessing device coordinated with the base case is mounted into the chassis, the pressing elastic plate of the fastening unit exposed outwards from the hollow portion can directly clamp the inner surface of the outer casing through the second clamping plate, and relatively abut against the vibration absorbing pad towards the first clamping plate to form a compression deformation, thereby providing a backward space for compression and elastic deformation. The positioning protrusion is stably engaged with the fixing hole of the data accessing device as the data accessing device and the chassis are engaged with each other, and cannot be released or detached from the fixing hole of the data accessing device easily.

According to another objective of the disclosure, the pressing elastic plate of the fastening unit is directly connected to the outer casing of the chassis, and thus not only the vibration absorbing pad can be used to reduce the vibration of the chassis transmitted to the data accessing device, but also the vibration absorbing pad absorbs the vibration energy generated when the data accessing device operates, thereby maintaining the data accessing device in an stable balance to eliminate vibration or resonance between the data accessing device and the chassis, thus improving the performance of the Rotational Vibration Index (RVI) test, and preventing the data accessing device from being damaged by vibration and tolerance during operation and testing. Therefore, the service life of the data accessing device in prolonged.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. In the drawings.

DESCRIPTION OF THE EMBODIMENTS

Figure 1:
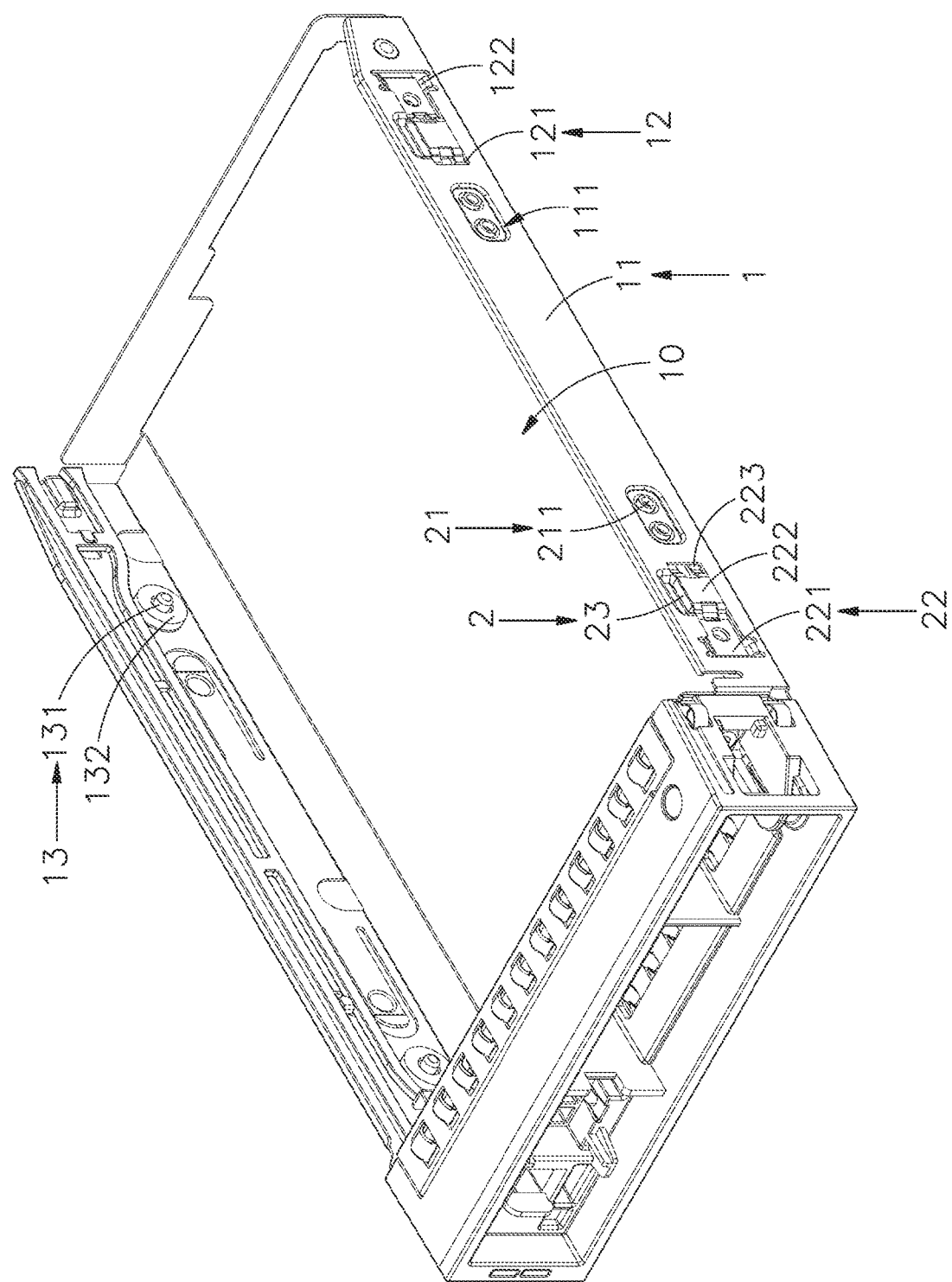
FIG. 1 is a perspective view of an elastic-plate fixing structure of a tray according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 2:
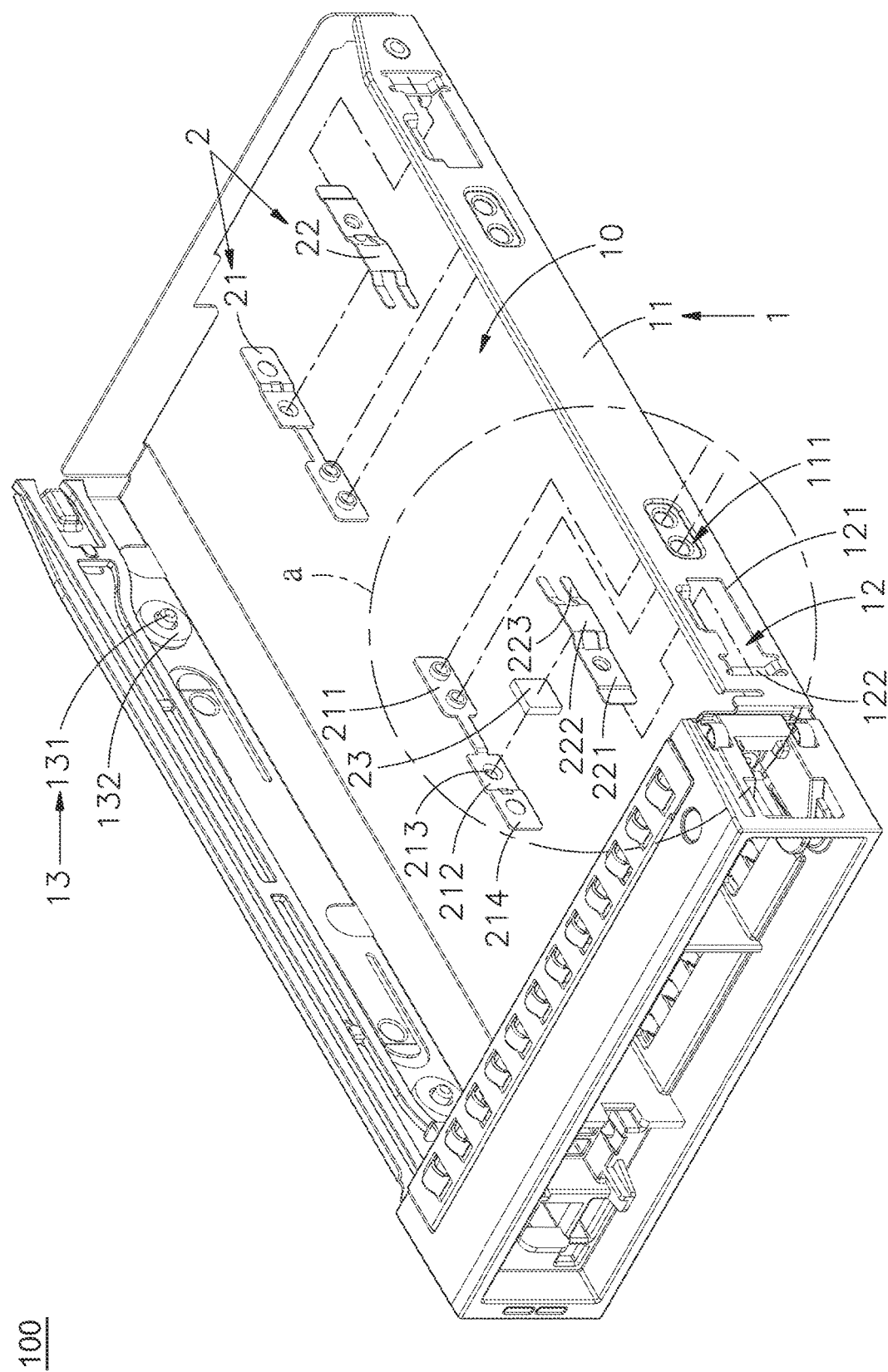
FIG. 2 is a partial exploded view of the elastic-plate fixing structure of the tray of the embodiment of the present disclosure.
Figure 3:
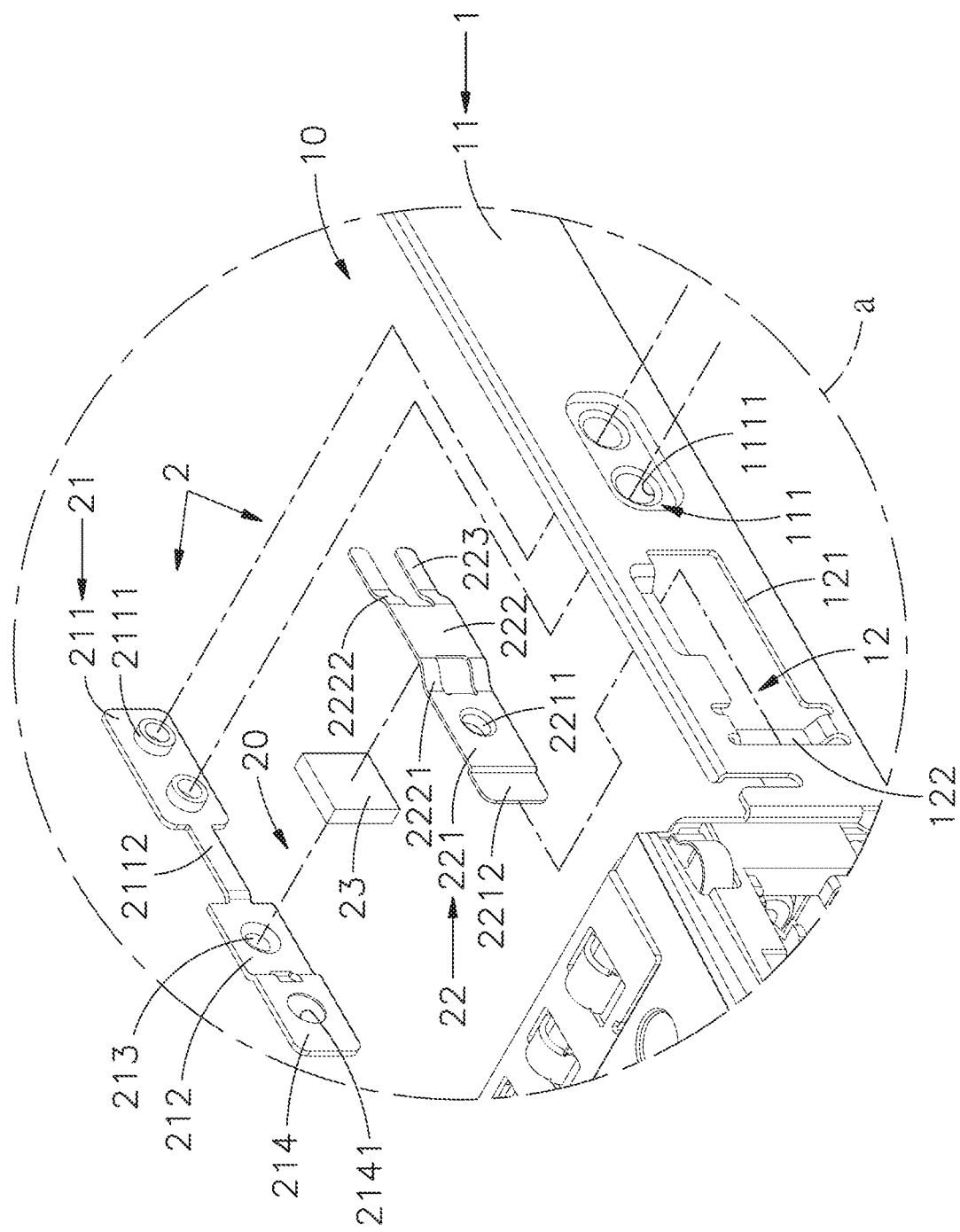
FIG. 3 is a partial enlarged view of a part "a" shown in FIG. 2.
Figure 4:
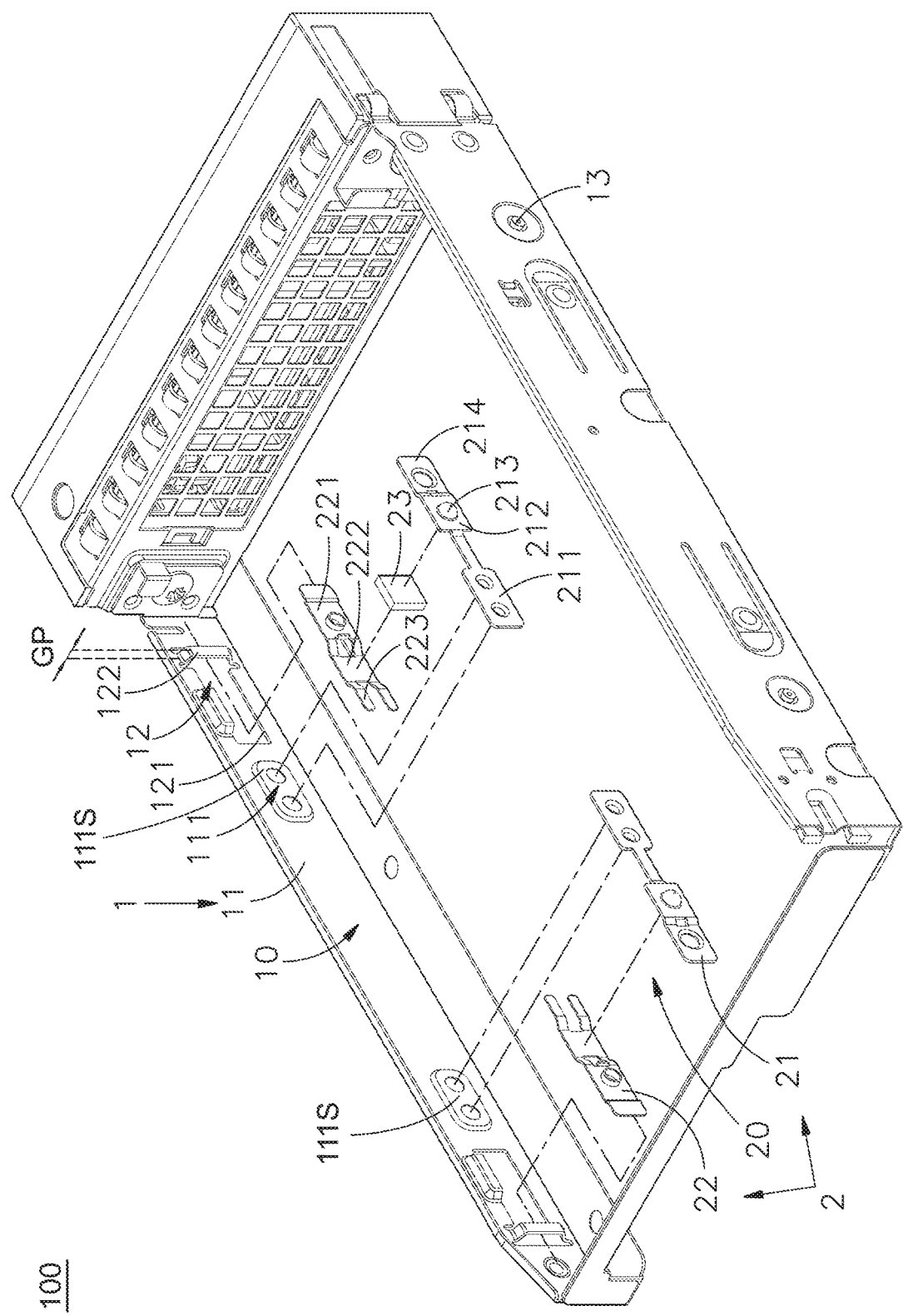
FIG. 4 is a partial exploded view of the elastic-plate fixing structure of the tray of FIG. 1 viewed from another aspect.
Figure 5:
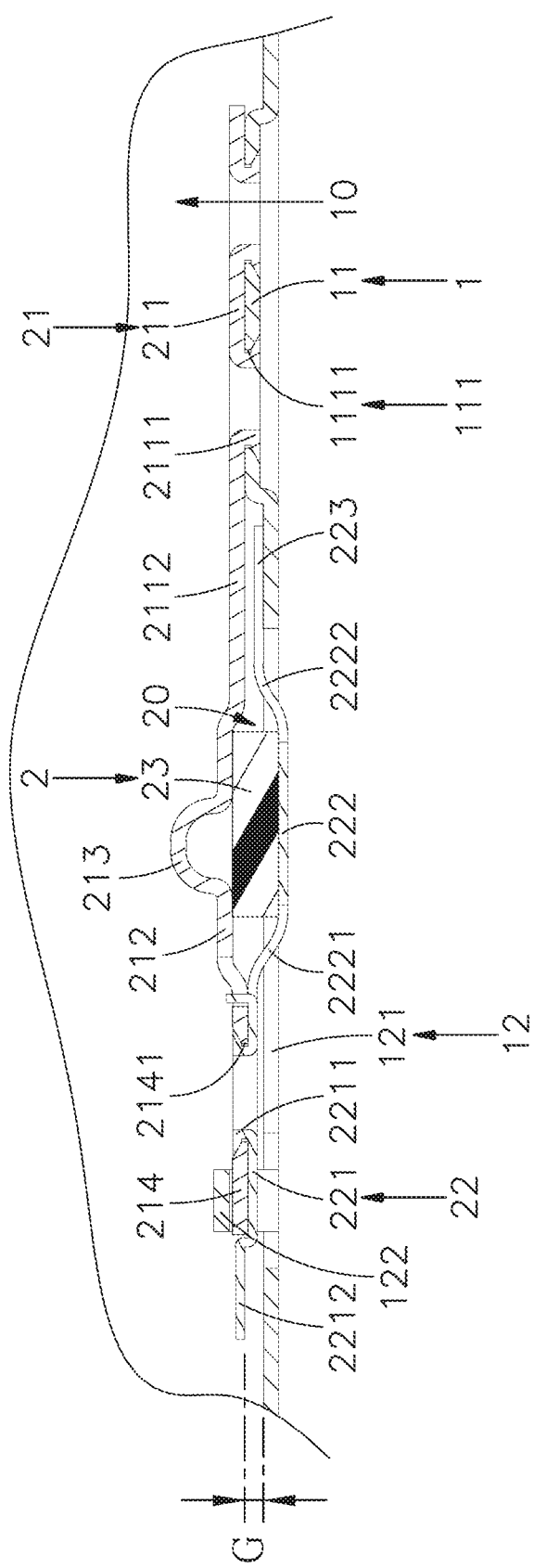
FIG. 5 is a partial cross-sectional view of the elastic-plate fixing structure of the tray of the embodiment of the present disclosure.

Reference is now made to FIG. 1 to FIG. 5, in which FIG. 1 is a perspective view of an elastic-plate fixing structure of a tray 100 according to one embodiment of the present disclosure, FIG. 2 is a partial exploded view of the elastic-plate fixing structure of the tray 100 of the embodiment of the present disclosure, FIG. 3 is a partial enlarged view of a part "a" shown in FIG. 2, FIG. 4 is a partial exploded view of the elastic-plate fixing structure of the tray 100 of FIG. 1 viewed from another view point, and FIG. 5 is a partial cross sectional view of the elastic-plate fixing structure of the tray 100 of the embodiment of the present disclosure. As clearly seen in FIG. 1 to FIG. 5, the elastic-plate fixing structure of the embodiment includes a base case 1 and at least one fastening unit 2, in which the base case 1 is a hollow container body having a rectangular accommodation space 10. Two upright sidewalls 11 of the base case 1 which are arranged abreast are provided at two opposite sides of the base case 1, respectively. One of the upright sidewalls 11 of the base case 1 is provided with at least one coupling portion 111 and a hollow portion 12. Each of the hollow portions 12 is spaced at a distance from each of the front region and the rear region of the periphery of the coupling portion 111. Each of the coupling portions 111 is provided with at least one engaging hole 1111. Each of the hollow portions 12 is formed with a through hole 121. Each of the upright sidewalls 11 of the base case 1 is provided with an arched blocking piece 122 at one end of the through hole 121, and the arched blocking piece 122 is connected to the upright sidewall 11 across the upper and lower sides of the through hole 121, and extends in a direction towards the accommodation space 10. Also, the base case 1 is provided with plural positioning portions 13 at an inner surface of the other upright sidewall 11 of the base case 1, and each of the positioning portions 13 is formed with a fastening bump 131 which is shaped as a lateral straight column, and is straightly aligned with one of the through holes 121. Each of the fastening bumps 131 is sleeved with a damping washer 132, respectively.

The fastening unit 2 includes an elastic buckle piece 21 which is coupled to an inner side surface 111S of the coupling portion 111; a pressing elastic plate 22 which is overlapped with and connected to one side of the elastic buckle piece 21; a vibration absorbing pad 23 which is fixedly positioned between the elastic buckle piece 21 and the pressing elastic plate 22; and plural first riveting spikes 2111 which are disposed on an outer surface of a first fixing portion 211 of the elastic buckle piece 21 and riveted and fixed to one of the engaging holes 1111. Each of the elastic buckle pieces 21 is provided with a swing arm 2112 extending outwards from one side of the first fixing portion 211, and a first clamping plate 212 which has continuous step differences and corresponds to the hollow portions 12. The elastic buckle piece 21 is provided with a dome positioning protrusion 213 which is disposed on an inner surface of the first clamping plate 212 and extends in a direction towards the accommodation space 10, and a connection portion 214 which extends outwards from one side of the first clamping plate 212 and is formed with an engaging hole 2141 thereon.

In the embodiment, the pressing elastic plate 22 is formed with a second fixing portion 221 which transversely passes through a gap GP between the through hole 121 and the blocking piece 122. Because the first fixing portion 211 of the elastic buckle piece 21 is fixed on the coupling portion 111, the pressing elastic plate 22 is fixedly abuts against the inner surface of the blocking piece 122. The pressing elastic plate 22 is formed with a second riveting spike 2211 which is disposed on an inner surface of the second fixing portion 221 and riveted and fixed to the engaging hole 2141. The pressing elastic plate 22 is formed with a block plate 2212 which curvedly extends outwards from one side of the second fixing portion 221. The pressing elastic plate 22 is formed with an arched second clamping plate 222 which is located at the other side of the second fixing portion 221 and aligned to the first clamping plate 212, and curvedly extends in a direction towards the hollow portion 12 in the through hole 121. The pressing elastic plate 22 is formed with at least one abutting end 223 which curvedly extends outwards from a side of the second clamping plate 222 and abuts against a peripheral surface of the through hole 121. Two sides of the second clamping plate 222 respectively adjacent to the second fixing portion 221 and the abutting ends 223 are separately provided with a first folding flank 2221 and a second folding flank 2222, and the first folding flank 2221 and the second folding flank 2222 are respectively formed in a curved protruding shape. A clamping space 20 is formed between the second clamping plate 222 and the first clamping plate 212, such that the vibration absorbing pad 23 can be received to be attached and positioned in the clamping space 20. The vibration absorbing pad 23 is a rectangular piece body which is monolithically formed from the material of rubber, silicone, foam or other materials with soft elasticity and a cushioning function.

Figure 6:
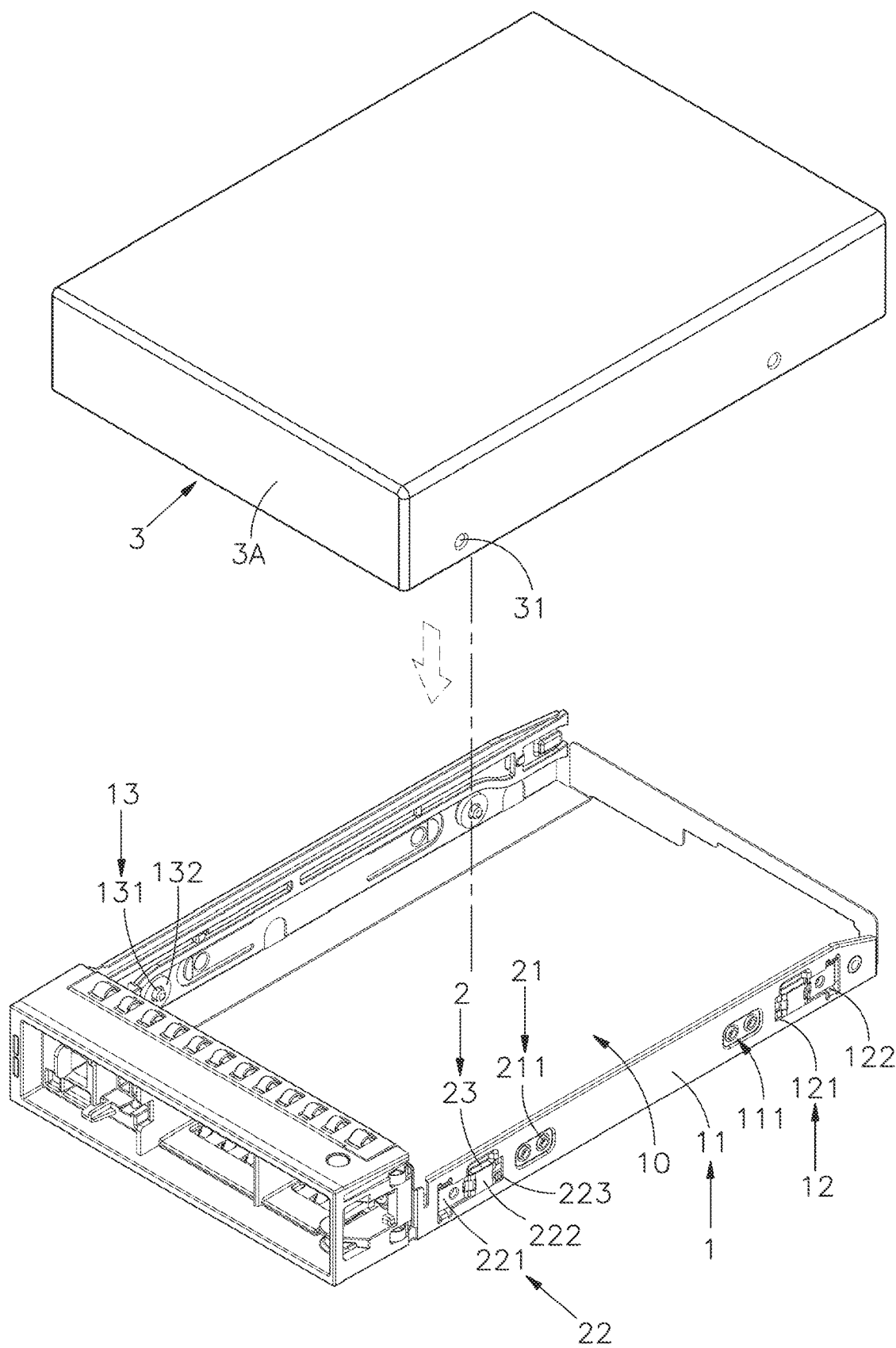
FIG. 6 is an exploded view of the embodiment of the present disclosure after a data accessing device is placed into the tray.
Figure 7:
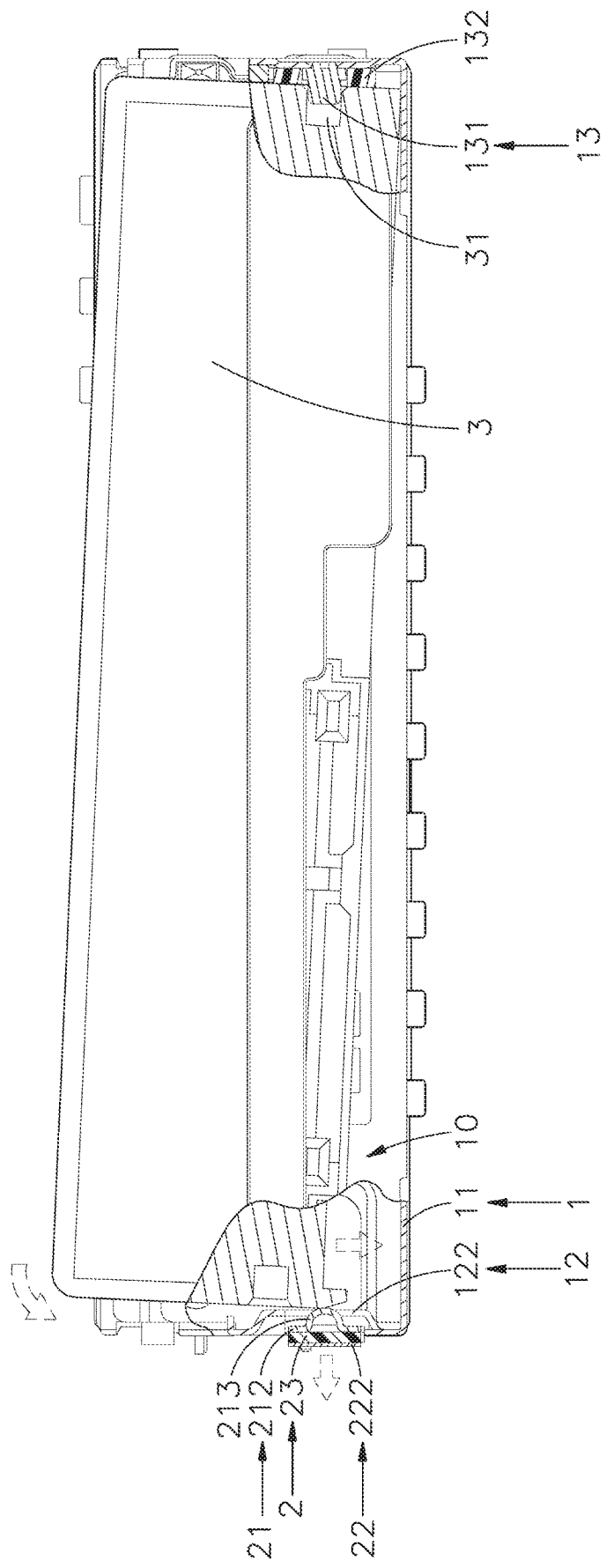
FIG. 7 is a rear view of the embodiment of the present disclosure when the data accessing device is pressed into the tray.
Figure 8:
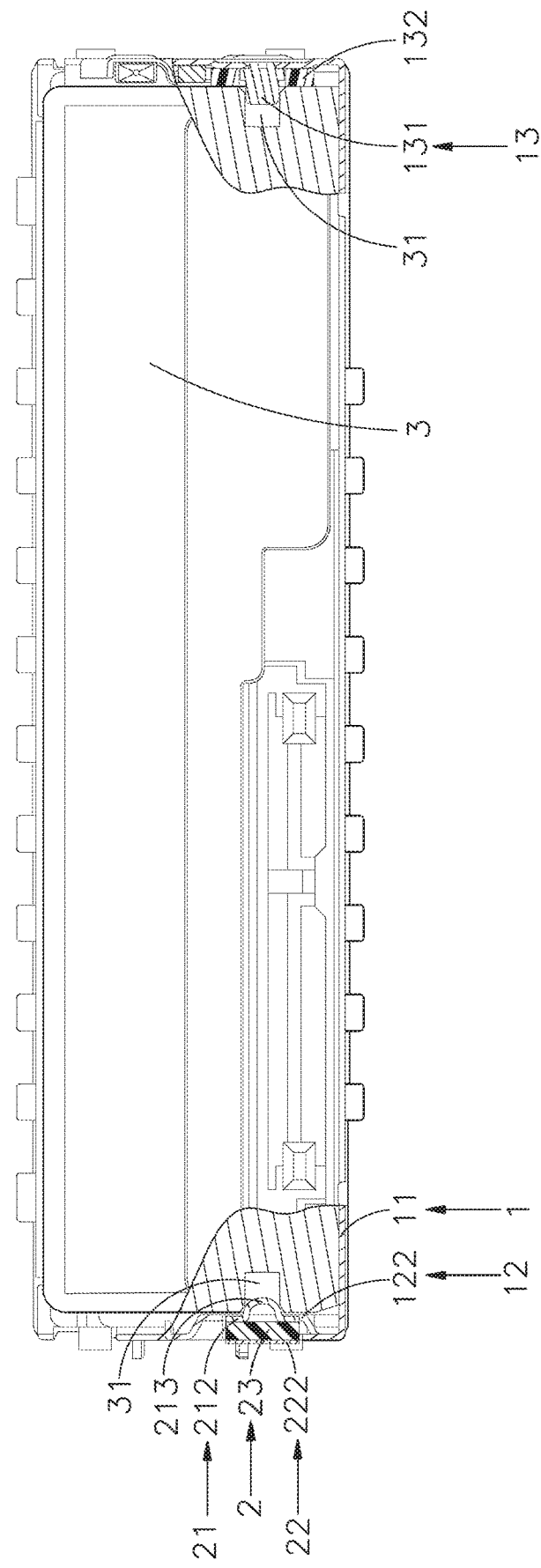
FIG. 8 is a rear view of the embodiment of the present disclosure after the data accessing device is pressed into the tray.
Figure 9:
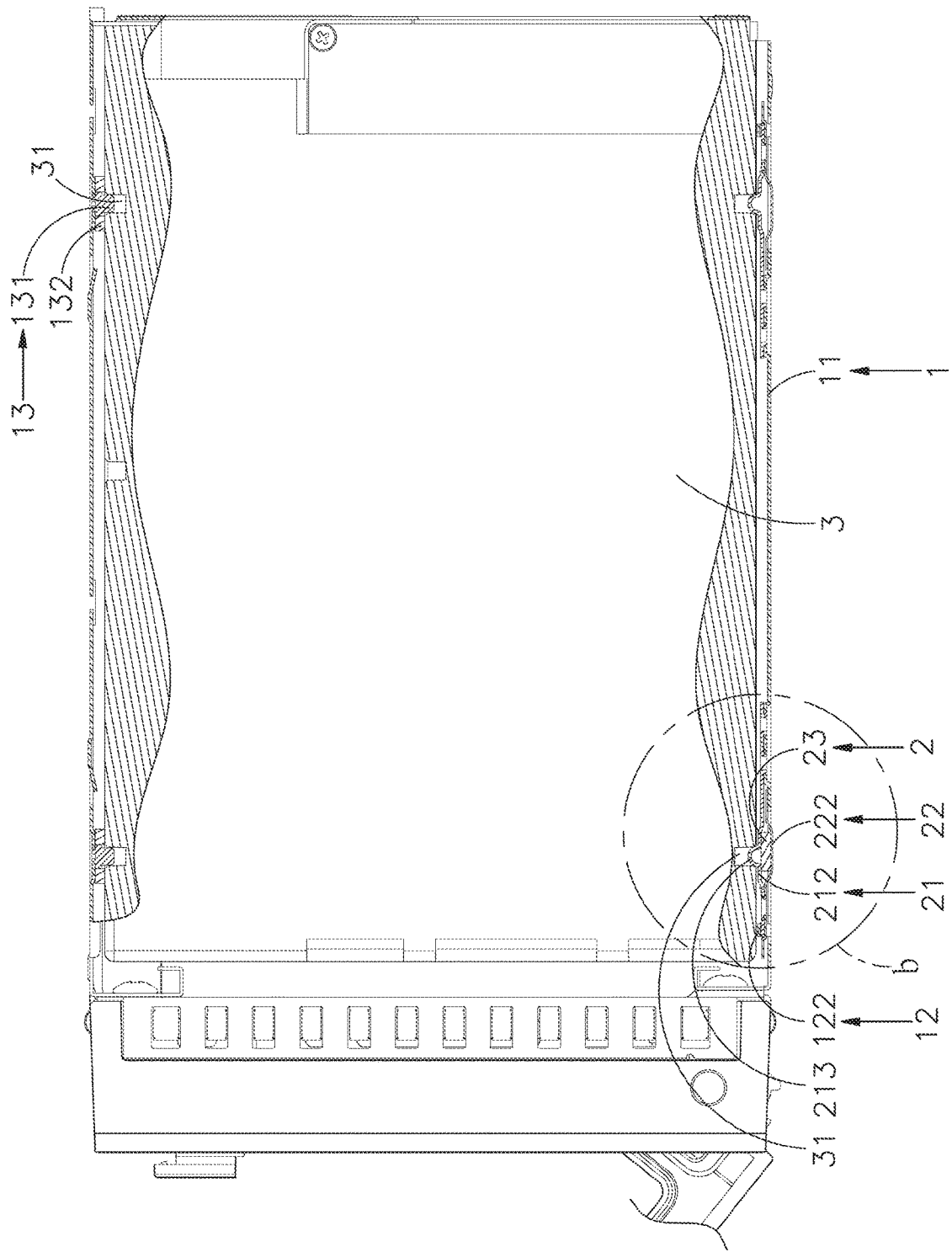
FIG. 9 is a top view of the embodiment of the present disclosure after the data accessing device is pressed into the tray.
Figure 10:
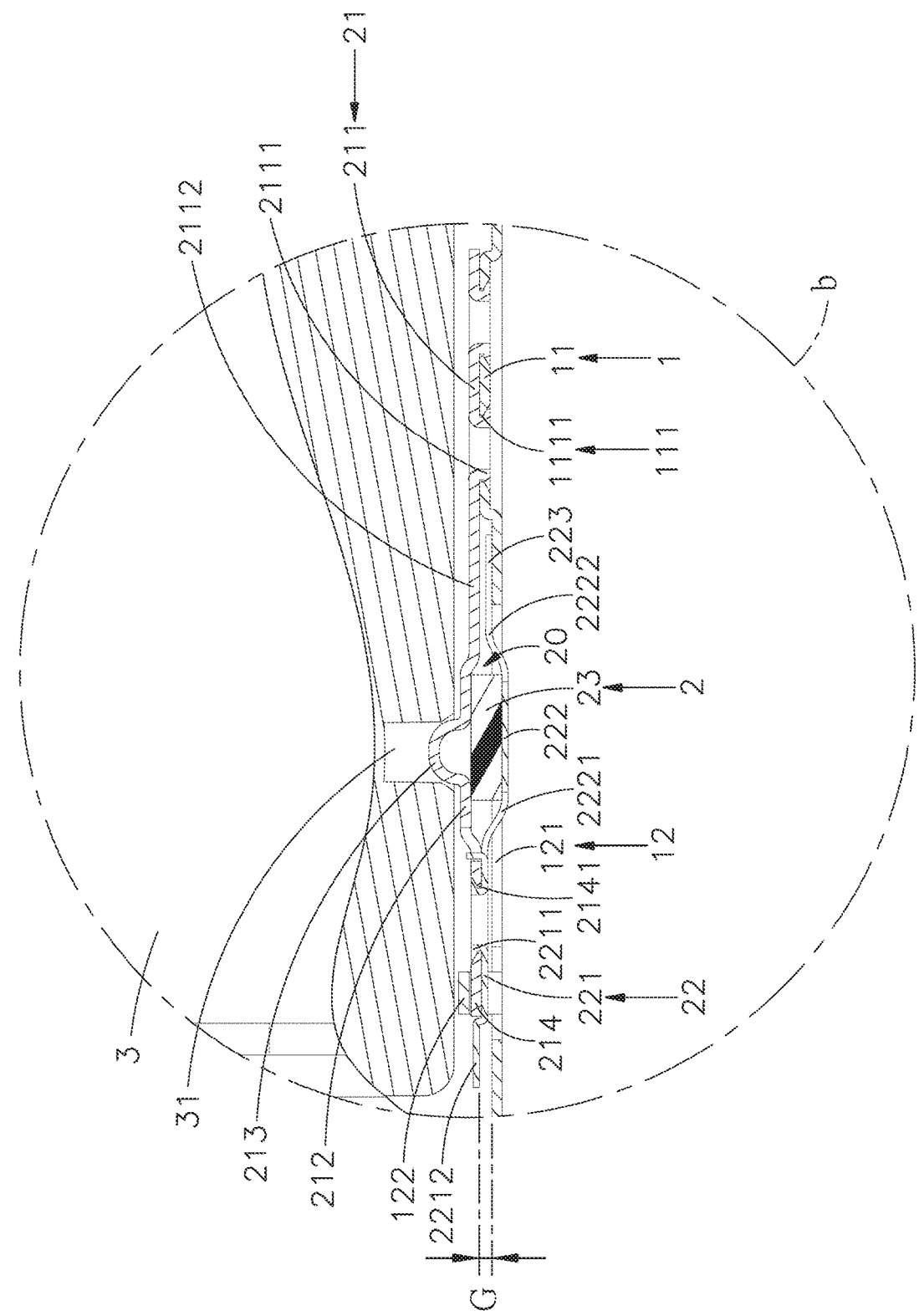
FIG. 10 is a partial enlarged view of a part "b" shown in FIG. 9.

Reference is now made to FIG. 6 to FIG. 10, in which FIG. 6 is an exploded view of the embodiment of the present disclosure after a data accessing device is placed into the tray 100, FIG. 7 is a rear view of the embodiment of the present disclosure when the data accessing device is pressed into the tray 100, FIG. 8 is a rear view of the embodiment of the present disclosure after the data accessing device is pressed into the tray 100, FIG. 9 is a top view of the embodiment of the present disclosure after the data accessing device is pressed into the tray 100, and FIG. 10 is a partial enlarged view of a part "b" shown in FIG. 9. As clearly seen in FIG. 6 to FIG. 10, when a data accessing device 3 is assembled with the tray 100, one side of the data accessing device 3 (i.e., 3.5-inch hard disk, HDD) is first placed obliquely into the accommodation space 10 of the base case 1, such that the fastening bumps 131 of the positioning portion 13 are respectively engaged with the fixing holes 31 of one side of the data accessing device 3.

After the other side of a bottom of the data accessing device 3 abuts against the positioning protrusion 213 of the elastic buckle piece 21 of the fastening unit 2, the data accessing device 3 is pressed downwardly into the accommodation space 10 of the base case 1. While the positioning protrusion 213 is being pressed, the first clamping plate 212 movably swing towards the hollow portion 12 by using the swing arm 2112 of the first fixing portion 211 as a fulcrum, and collectively pushes the block plate 2212 of the second fixing portion 221 to abut against the peripheral surface of one of the through holes 121. Because the abutting ends 223 respectively abut against the peripheral surface of the through hole 121, the first clamping plate 212 relatively presses the vibration absorbing pad 23 towards the second clamping plate 222 to form a compression deformation, so as to form an elastic deformation space for the positioning protrusion 213 of the elastic buckle piece 21 to movably swing, thus facilitating the installation of the data accessing device smoother. When the data accessing device 3 is pressed downwardly to a predetermined position, after the vibration absorbing pad 23 cooperated with the elastic buckle piece 21 and the pressing elastic plate 22 of the fastening unit 2 undergo an elastic deformation and recovery process, the positioning protrusions 213 are respectively engaged with the fixing holes 31 at the other side of the data accessing device 3, such that the tray 100 cannot be released or detached from the fixing holes 31 of the data accessing device 3 easily. Thus, users can easily and stably place the data accessing device 3 in the accommodation space 10 of the base case 1 without using detaching tools, thus having the advantages of structural stability and convenient assembly.

In the embodiment, the coupling portions 111 which are respectively located at the front side and the rear side of one of the sidewalls 11 of the base case 1 are coupled with a number of the fastening units 2, in which each of the fastening units 2 includes the elastic buckle piece 21, the pressing elastic plate 22 and the vibration absorbing pad 23. However, in practical applications, the fastening unit 2 coupled to the rear of the base case 1 can also omit the structural design of the vibration absorbing pad 23, so as to increase the elasticity and the movement of the elastic buckle piece 21 when the elastic buckle piece 21 movably swings, thereby reducing poor assembly problems of the elastic buckle piece 21 which is too hard and not easy to be bent to lead the fixing holes 31 of the data accessing device 3 to interfere excessively with the fixing hole 31 of the data accessing device 3 and to cause poor assembly because the arrangement of the vibration absorbing pad 23. In addition, the fastening units 2 are only coupled with the coupling portion 111 of the base case 1 located at the front side of one of the sidewalls 11 of the base case 1 according to the design structure of the data accessing device 3. It is to be noted that all simple modifications and equivalent structural varieties based on the present specification and the drawings should be similarly included in the scope of this disclosure.

when desiring to pull out the data accessing device 3, the user only needs to upwardly pull the data accessing device 3 at the bottom thereof adjacent to one of the fastening unit 2, so as to push the positioning protrusion 213 of the elastic buckle piece 21 by the fixing hole 31 of the data accessing device 3 such that the first fixing portion 211 can movably swing the hollow portion 12 by using the first fixing portion 211 as a fulcrum. Since the data accessing device 3 coordinated with the base case 1 is not yet inserted into a chassis 4 (see FIG. 11 and FIG. 12), a backward space G allowing the elastic buckle piece 21 to move backwards to the hollow portion 12 can be formed between the block plate 2212 of the second fixing portion 221 and one of the sidewalls 11 of the base case 1. Thus, the convenience of assembling or disassembling the data accessing device 3 is increased. After the positioning protrusion 213 is collectively moved to be disengaged from the fixing hole 31 of one side of the data accessing device 3, the data accessing device 3 can be lifted upwardly so as to remove the positioning protrusion 213 away from the fixing hole 31 of the other side of the data accessing device 3. Thus, the convenience of disassembling the data accessing device 3 can be increased, and the data accessing device 3 is not needed to be fixed by means of screw locking, and the labor and cost of the screw material and the lock fixing can be saved, and the purpose of quickly assembling or disassembling the data accessing device 3 can be achieved.

Figure 11:
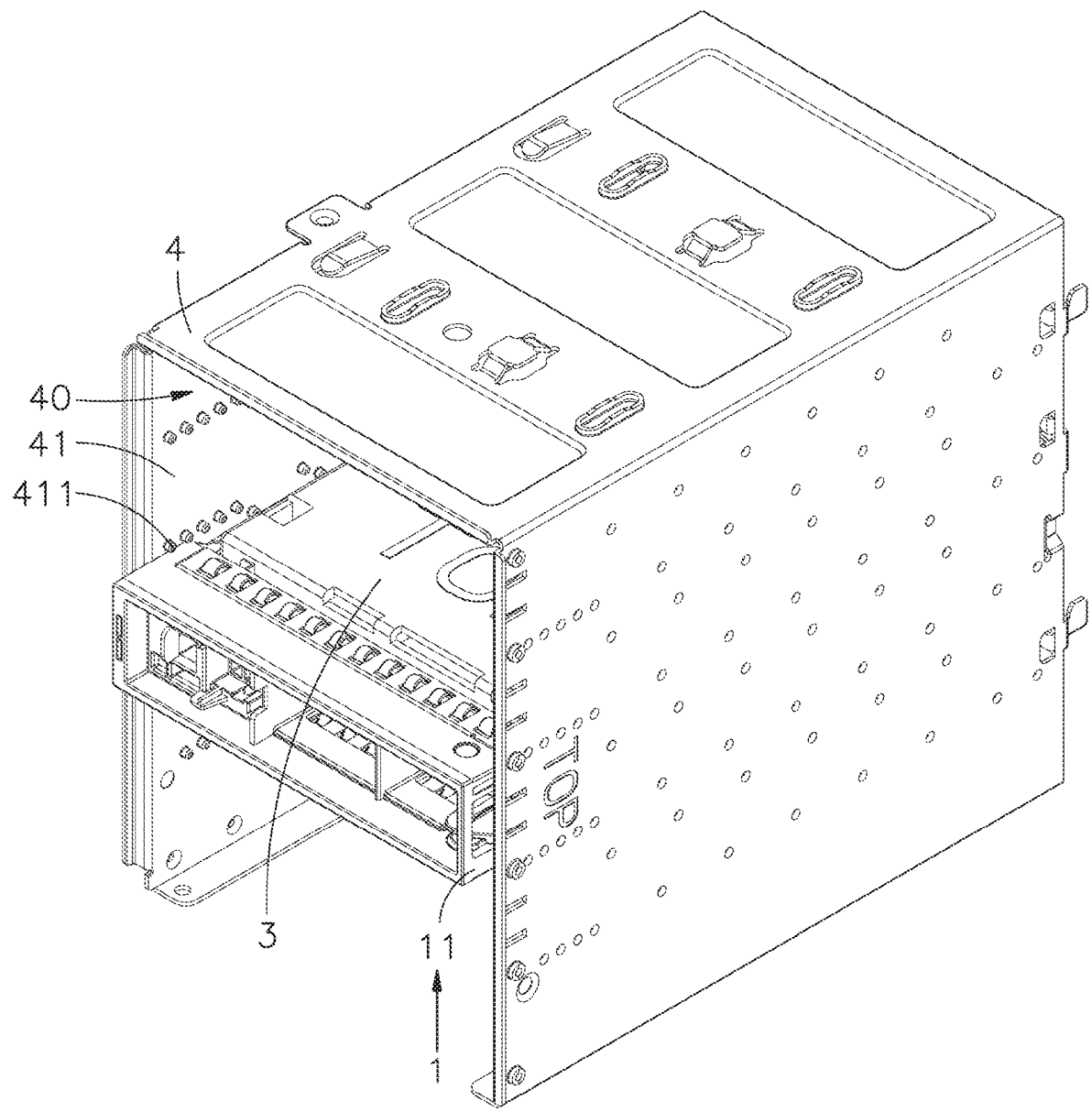
FIG. 11 is a perspective view of an elastic-plate fixing structure of a tray mounted into a chassis according to one embodiment of the present disclosure.
Figure 12:
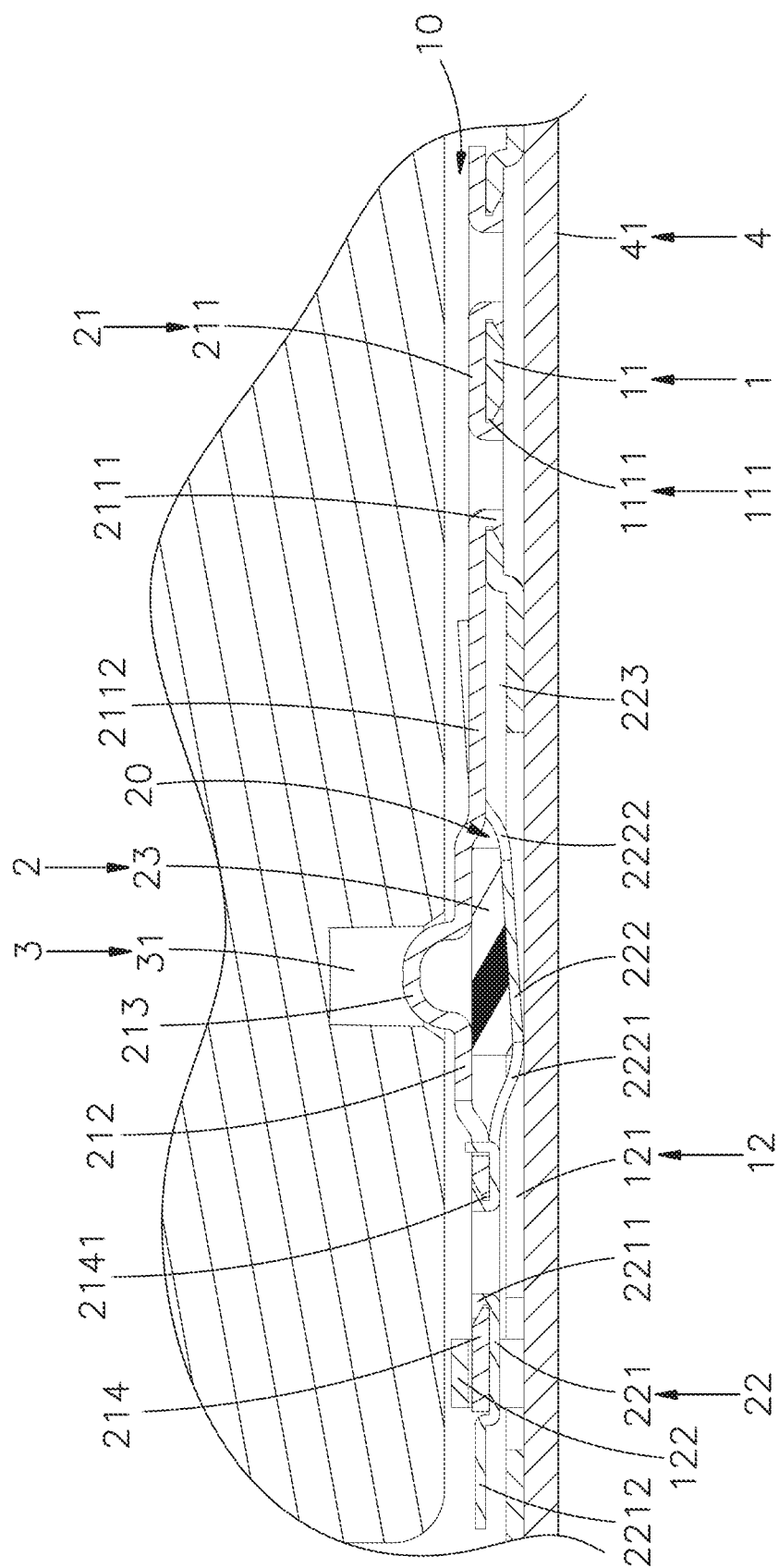
FIG. 12 is a partial cross-sectional view of the elastic-plate fixing structure of the tray mounted into a chassis according to one embodiment of the present disclosure.

Also refer to FIG. 11 and FIG. 12 in which FIG. 11 is a perspective view of an elastic-plate fixing structure of a tray 100 mounted into a chassis according to one embodiment of the present disclosure, and FIG. 12 is a partial cross sectional view of the elastic-plate fixing structure of the tray 100 mounted into a chassis according to one embodiment of the present disclosure. As clearly seen in FIG. 11 and FIG. 12, the elastic-plate fixing structure of the tray 100 of the embodiment can be implemented to a chassis 4 of a computer mainframe, a server chassis, a storage cabinet or a telecommunication cabinet. An interior of an outer casing 41 of the chassis 4 is formed with a positioning space 40 having an insertion slot at a front end of the chassis 4, and two inner sidewall surfaces of the outer casing 41 are respectively formed with a plurality guide blocks 411 which are horizontally arranged at intervals.

When the data accessing devices 3 separately coordinated with the base case 1 of the embodiment are mounted into the chassis together, the base case 1 is first inserted laterally into the positioning space 40 of the chassis 4 in which the bottom of the base case 1 is moved to a predetermined position along the guide blocks 411, and the pressing elastic plate 22 exposed outwards from the hollow portion 12 can be directly connected to one of the inner sidewall surfaces of the outer casing 41 with the second clamping plate 222. After the second clamping plate 222 is pushed, the second clamping plate 222 can relatively press against the vibration absorbing pad 23 towards the first clamping plate 212 of the elastic buckle piece 21 to form a compression deformation, and collectively push the abutting ends 223 of the pressing elastic plate 22 to be disengaged from the through hole 121 so as to provide a deformation space for compression and elastic deformation. After the base case 1 is inserted to the predetermined position, the positioning protrusion 213 of the elastic buckle piece 21 can be stably engaged with the fixing hole 31 of the data accessing device 3 by the fixing hole 31 of the data accessing device 3 and the inner surface of outer casing 41 of the chassis 4 are engaged with each other, and cannot be released or detached from the fixing hole 31 of the data accessing device 3 easily. The pressing elastic plate 22 of the fastening unit 2 is directly connected to the outer casing 41 of the chassis 4, and thu not only the vibration absorbing pad 23 can be used to reduce the vibration of the chassis 4 transmitted to the data accessing device 3, but also the vibration absorbing pad 23 absorbs the vibration energy generated when the data accessing device 3 operates, so as to maintain the data accessing device 3 to stay in an stable balance to eliminate vibration or resonance between the data accessing device 3 and the chassis 4, improve the performance of the Rotational Vibration Index (RVI) test, and prevent the data accessing device 3 from being damaged by vibration and tolerance during operation and testing. Thereby increasing the service life of the data accessing device 3.

Figure 13:
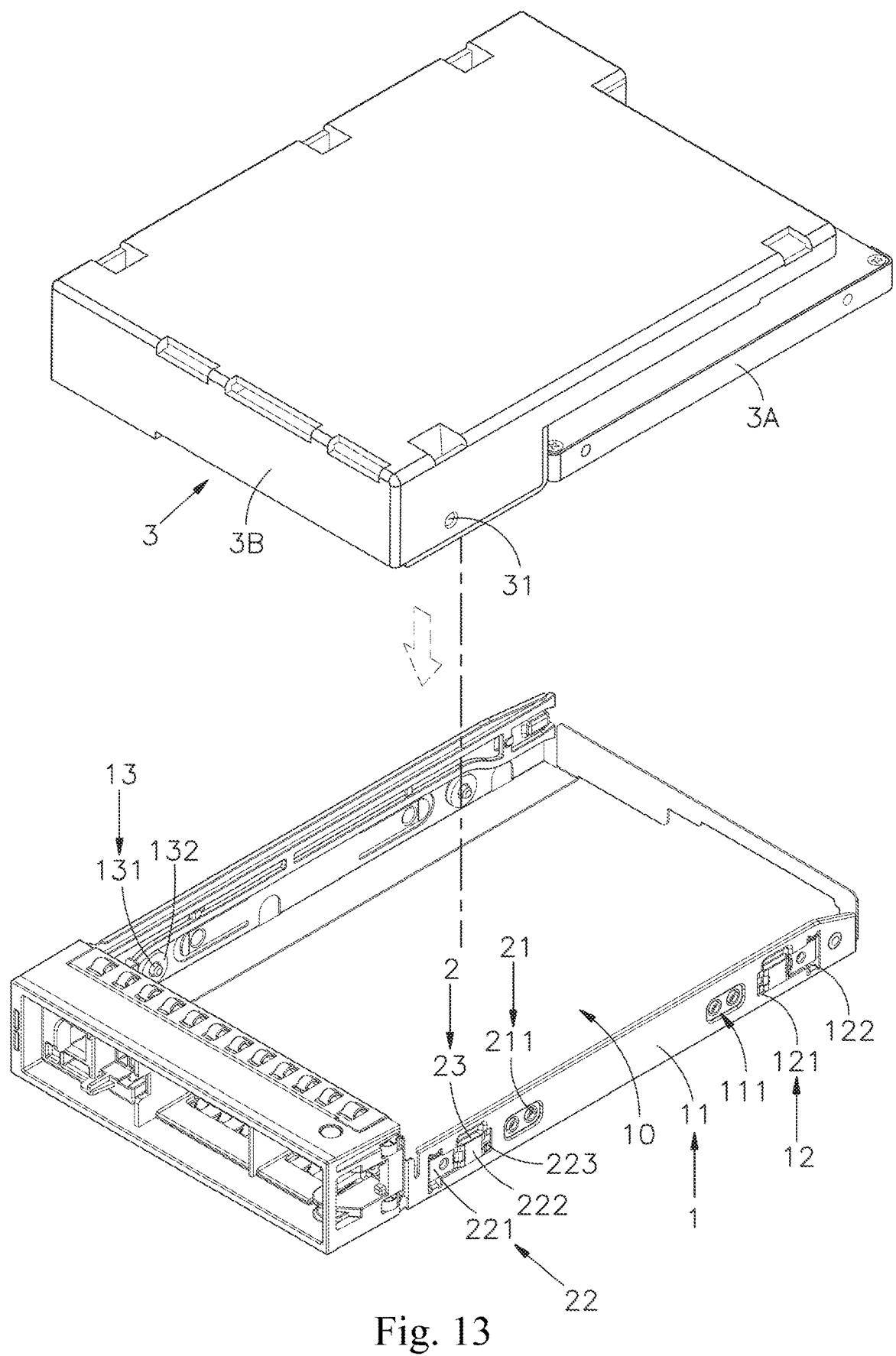
FIG. 13 is an exploded view of an elastic-plate fixing structure of the tray and a data accessing device of another embodiment of the present disclosure.
Figure 14:
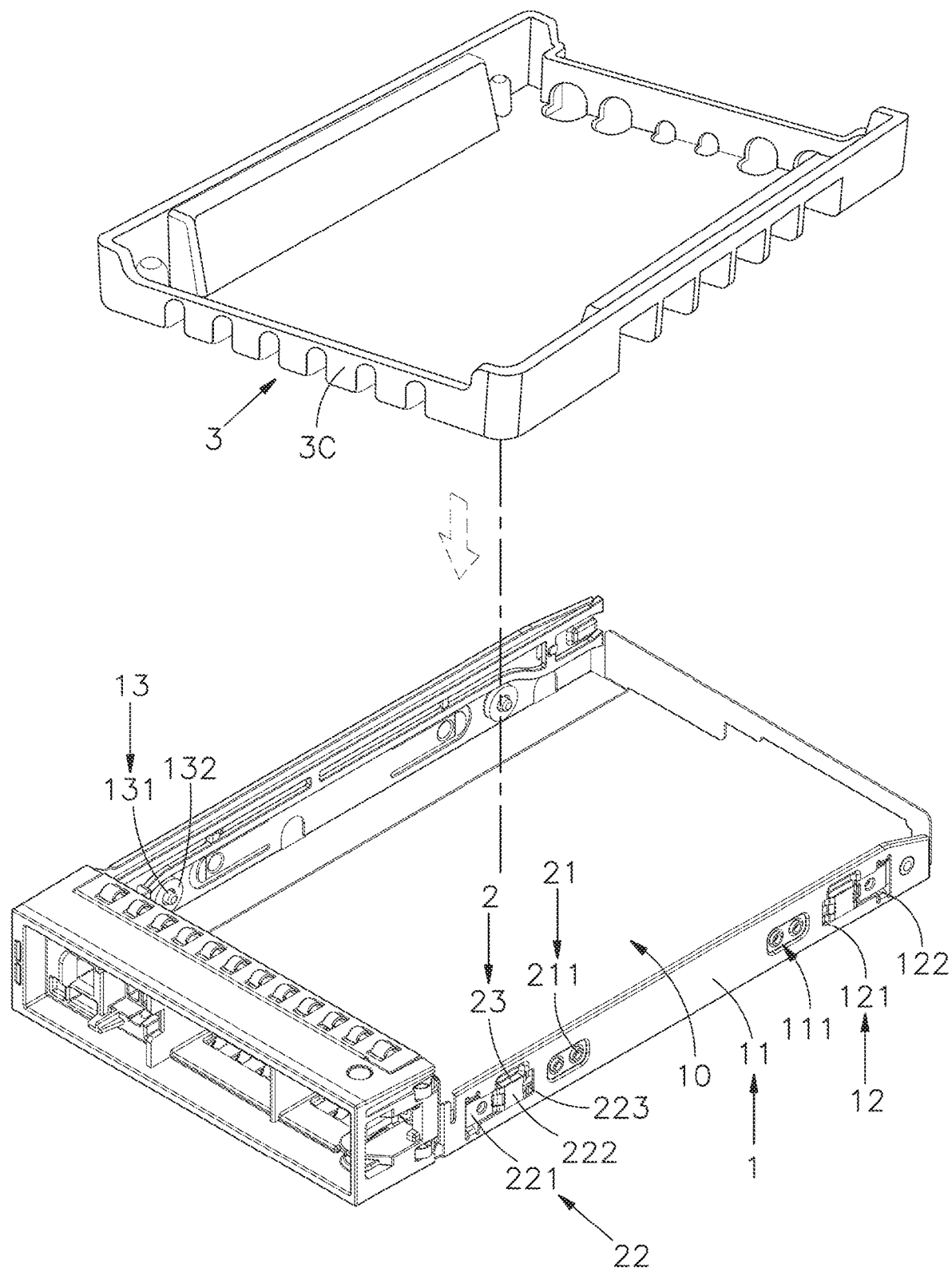
FIG. 14 is an exploded view of an elastic-plate fixing structure of the tray and a data accessing device of one another embodiment of the present disclosure.

As shown in FIG. 13 and FIG. 14 in which FIG. 13 is an exploded view of an elastic-plate fixing structure of the tray 100 and a data accessing device of another embodiment of the present disclosure, and FIG. 14 is an exploded view of an elastic-plate fixing structure of the tray 100 and a data accessing device of one another embodiment of the present disclosure. As clearly seen in FIG. 13 and FIG. 14, the data accessing device 3 used to be applied implemented to the elastic-plate fixing structure of the tray 100 can include, but is not limited to, a 3.5-inch hard disk (HDD) 3A. The 3.5-inch hard disk 3A is installed in the accommodation space 10 of the base case 1 according to the above-mentioned assembly manner (as shown in FIG. 6). However, in the practical application, the data accessing device 3 can also be a 2.5-inch hard disk or a solid-state hard disk (SSD) 3A with an adapter 38 (as shown in FIG. 13), and is able to be installed in an accommodation space 10 of the base case 1 with 3.5-inch dimension. The design of the base case 1 can also be altered in accordance with the size and shape of the data accessing device 3 corresponding thereto, for example, the 2.5-inch hard disk or the solid-state hard disk (preferably 2.5-inch solid state drive, SSD) is directly installed inside a base case 1 with 2.5-inch dimension.

In addition, if the data accessing device 3 is not yet to be installed in the chassis 4, or the data accessing device 3 is not necessary to be installed in the chassis 4, in order to maintain airflow volume and stability of flow channels in the chassis 4 so as to guarantee the whole wind current path of a server system, a dummy HDD 3C (see FIG. 14) which is shaped and sized equally to the data accessing device 3 is normally used to fill into the empty position supposed to place the real data accessing device. Thus, either the data accessing device 3 or the dummy HDD can be coordinated with the base case 1 and then installed in the chassis 4. It is to be noted that all simple modifications and equivalent structural varieties based on the present specification and the drawings should be similarly included in the scope of this disclosure.

To sum up, in the main objective of the disclosure, the elastic-plate fixing structure includes a base case 1 for receiving a data accessing device 3 therein. Each of two sidewalls 11 of the base case 1 is coupled to at least one fastening unit 2. The fastening unit 2 includes an elastic buckle piece 21, a pressing elastic plate 22 overlapped and connected to one side of the elastic buckle piece 21, and a vibration absorbing pad 23 fixedly positioned between the elastic buckle piece 21 and the pressing elastic plate 22. A first clamping plate 212 of the elastic buckle piece 21 is formed with a positioning protrusion 213, and a second clamping plate 222 is exposed outwardly and curvedly extends outwards from a part of the pressing elastic plate 22 towards the hollow portion 12. Since the vibration absorbing pad 23 is attached to be positioned between the first clamping plate 212 and the second clamping plate 222, a backward space G is provided to allow the elastic buckle piece 21 to move backwards to the hollow portion 12 through the backward space G, thus the positioning protrusion 213 is allowed to be engaged with or disengaged from the fixing hole 31 of the data accessing device 3.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. An elastic-plate fixing structure of a tray for receiving a data accessing device, the elastic-plate fixing structure comprising a base case and at least one fastening unit, wherein:

the base case has an accommodation space internally, at least one coupling portion that is disposed on one of two sidewalls of the base case, and a hollow portion that is located at a periphery of each of the at least one coupling portion; and the at least one fastening unit comprises an elastic buckle piece, a pressing elastic plate, a vibration absorbing pad, a first clamping plate, a positioning protrusion, and a second clamping plate, wherein the elastic buckle piece is coupled to an inner side surface of the at least one coupling portion, the pressing elastic plate is overlapped with and connected to one side of the elastic buckle piece, the vibration absorbing pad is fixedly positioned between the elastic buckle piece and the pressing elastic plate, the first clamping plate extends outwards from the elastic buckle piece and is aligned with the hollow portion, the positioning protrusion is formed on an inner surface of the first clamping plate and extends towards the accommodation space, the second clamping plate curvedly extends outwards from a part of the pressing elastic plate aligned with the first clamping plate and towards the hollow portion, and is exposed outwards from the hollow portion, and a clamping space is formed between the first clamping plate and the second clamping plate for receiving the vibration absorbing pad therein.

2. The elastic-plate fixing structure of claim 1, wherein one of the at least one coupling portions disposed on the one of the two sidewalls of the base case has at least one engaging hole, the elastic buckle piece has a first fixing portion, the first fixing portion has a first riveting spike on an outer surface of the first fixing portion, and is riveted and fixed to the engaging hole.

3. The elastic-plate fixing structure of claim 2, wherein an inner surface of the other of the two sidewalls of the base case has a plurality of positioning portions, each of the positioning portions is formed with a fastening bump, and each of the fastening bumps is sleeved with a damping washer, respectively.

4. The elastic-plate fixing structure of claim 1, wherein the elastic buckle piece of the at least one fastening unit has a first fixing portion, and the first fixing portion is coupled to an inner surface of one of the at least one coupling portions disposed on the one of the two sidewalls of the base case, the first clamping plate extends outwards from the first fixing portion and is aligned with the hollow portion, the first clamping plate has a connection portion extending outwards from the first clamping plate, the pressing elastic plate has a second fixing portion, and the connection portion is connected to the second fixing portion of the pressing elastic plate, and the second clamping plate curvedly extends outwards from the second fixing portion and towards the hollow portion, and the second clamping plate is exposed outwards from the hollow portion.

5. The elastic-plate fixing structure of claim 4, wherein the hollow portion of the base case has a through hole, the second clamping plate of the pressing elastic plate curvedly extends outwards from the second fixing portion and towards the hollow portion, and passes through the through hole, and the second clamping plate has at least one abutting end curvedly extending outwards from the second clamping plate and abutting against a peripheral surface of the through hole.

6. The elastic-plate fixing structure of claim 5, wherein two sides of the second clamping plate that are respectively adjacent to the second fixing portion and the abutting end have a first folding flank and a second folding flank respectively, and each of the first folding flank and the second folding flank is formed in a curved protruding shape.

7. The elastic-plate fixing structure of claim 5, wherein the hollow portion of the base case has a blocking piece at one end of the through hole, the blocking piece is connected across an upper side and a lower side of the through hole, and the second fixing portion of the pressing elastic plate transversely passes through a gap between the through hole and the blocking piece, and the pressing elastic plate fixedly abuts against the inner surface of the blocking piece through the first fixing portion of the elastic buckle piece, and the second fixing portion has a block plate that curvedly extends outwards from one side of the second fixing portion for abutting against the peripheral surface of the through hole.

8. The elastic-plate fixing structure of claim 7, wherein the pressing elastic plate has a backward space formed between the block plate of the second fixing portion and one sidewall of the base case, and the backward space allows the elastic buckle piece to move backwards to the hollow portion.

9. The elastic-plate fixing structure of claim 1, wherein the hollow portion of the base case has a through hole, the hollow portion of the base case has an arched blocking piece at one end of the through hole, the arched blocking piece is connected across an upper side and a lower side of the through hole and extends towards the accommodation space, one end of the pressing elastic plate of the at least one fastening unit transversely passes through a gap between the through hole and the arched blocking piece, and the at least one fastening unit fixedly abuts against the inner surface of the arched blocking piece so as to provide a backward space between the pressing elastic plate and one sidewall of the base case.

10. The elastic-plate fixing structure of claim 1, wherein the vibration absorbing pad of the at least one fastening unit comprises rubber, silicone or foam.

* * * * *